(12) United States Patent
Chen et al.

(10) Patent No.: US 10,475,194 B2
(45) Date of Patent: Nov. 12, 2019

(54) METHOD, DEVICE, AND NON-TRANSITORY COMPUTER READABLE STORAGE MEDIUM FOR OBJECT TRACKING

(71) Applicant: HTC Corporation, Taoyuan (TW)

(72) Inventors: Yuan-Tung Chen, Taoyuan (TW); Tzu-Yin Chang, Taoyuan (TW); Hsu-Hong Feng, Taoyuan (TW)

(73) Assignee: HTC Corporation, Taoyuan (TW)

(*) Notice: Subject to any disclaimer, the term of this patent is extended or adjusted under 35 U.S.C. 154(b) by 102 days.

(21) Appl. No.: 15/822,192

(22) Filed: Nov. 26, 2017

(65) Prior Publication Data

US 2018/0174310 A1   Jun. 21, 2018

Related U.S. Application Data

(60) Provisional application No. 62/435,857, filed on Dec. 19, 2016, provisional application No. 62/435,855, filed on Dec. 19, 2016.

(51) Int. Cl.
| | |
|---|---|
| *G09G 5/02* | (2006.01) |
| *G06K 9/00* | (2006.01) |
| *G06T 7/246* | (2017.01) |
| *G06T 7/90* | (2017.01) |
| *H04N 5/232* | (2006.01) |
| *G06K 9/20* | (2006.01) |
| *G06K 9/46* | (2006.01) |
| *G06K 9/32* | (2006.01) |

(52) U.S. Cl.
CPC ........... *G06T 7/248* (2017.01); *G06K 9/0055* (2013.01); *G06K 9/00671* (2013.01); *G06K 9/2027* (2013.01); *G06K 9/2054* (2013.01); *G06K 9/4652* (2013.01); *G06T 7/90* (2017.01); *H04N 5/23203* (2013.01); *G06K 2009/3291* (2013.01); *G06T 2207/10024* (2013.01); *G06T 2207/10152* (2013.01)

(58) Field of Classification Search
USPC ........ 382/100, 103, 106–107, 155, 162–168, 382/173, 181, 199, 209, 220, 232, 254, 382/274, 276, 286–291, 305, 312; 463/33; 345/156, 597
See application file for complete search history.

(56) References Cited

U.S. PATENT DOCUMENTS

| | | | | |
|---|---|---|---|---|
| 2001/0024512 A1* | 9/2001 | Yoronka | ............ | G06K 9/00335 382/103 |
| 2010/0124358 A1* | 5/2010 | Huang | ............... | G06K 9/00342 382/103 |

(Continued)

FOREIGN PATENT DOCUMENTS

| | | |
|---|---|---|
| CN | 106019265 A | 10/2016 |
| TW | I517092 B | 1/2016 |

OTHER PUBLICATIONS

Corresponding Taiwanese office action dated Jul. 4, 2018.

*Primary Examiner* — Seyed H Azarian
(74) *Attorney, Agent, or Firm* — CKC & Partners Co., LLC (57) ABSTRACT

An object tracking method includes configuring a color of a first illuminating object to vary in a first pattern, capturing the first illuminating object according to a first color during a first time period, and capturing the first illuminating object according to a second color during a second time period after the first time period, wherein the second color is different from the first color.

14 Claims, 6 Drawing Sheets

(56) References Cited

U.S. PATENT DOCUMENTS

| | | | |
|---|---|---|---|
| 2014/0085194 A1* | 3/2014 | Ye | G06F 3/01 |
| | | | 345/156 |
| 2015/0346327 A1 | 12/2015 | Beall et al. | |
| 2016/0129346 A1* | 5/2016 | Mikhailov | A63F 13/285 |
| | | | 463/33 |
| 2016/0307332 A1* | 10/2016 | Ranjan | G06K 9/2027 |

* cited by examiner

METHOD, DEVICE, AND NON-TRANSITORY COMPUTER READABLE STORAGE MEDIUM FOR OBJECT TRACKING

RELATED APPLICATIONS

This application claims priority to U.S. Provisional Application Ser. No. 62/435,857 filed Dec. 19, 2016 and U.S. Provisional Application Ser. No. 62/435,855 filed Dec. 19, 2016, which are herein incorporated by reference.

BACKGROUND

Technical Field

The present disclosure relates to an electronic device and a method. More particularly, the present disclosure relates to an object tracking device and an object tracking method.

Description of Related Art

Nowadays, computer vision methods, in particular, object tracking, are widely used in various application. For example, object tracking may be used in a virtual reality (VR) u system to detect the movement of users.

However, it is difficult to distinguish the object while the color of the environment background is similar to the object color. It would take time for the system to remove the misidentified false target and thus resulting a low accuracy and/or efficiency.

SUMMARY

One aspect of the present disclosure is related to an object tracking method. In accordance with one embodiment of the present disclosure, the object tracking method includes: configuring a color of a first illuminating object to vary in a first pattern; capturing the first illuminating object according to a first color during a first time period; and capturing the first illuminating object according to a second color during a second time period after the first time period, wherein the second color is different from the first color.

Another aspect of the present disclosure is related to an object tracking device. In accordance with one embodiment of the present disclosure, the object tracking device includes one or more processing components, a camera electrically connected to the one or more processing components, a memory electrically connected to the one or more processing components, and one or more programs. The one or more programs are stored in the memory and configured to be executed by the one or more processing components. The one or more programs comprising instructions for: configuring a color of a first illuminating object to vary in a first pattern; controlling the camera to capture the first illuminating object according to a first color during a first time period; and controlling the camera to capture the first illuminating object according to a second color during a second time period after the first time period, in which the second color is different from the first color.

Another aspect of the present disclosure is related to a non-transitory computer readable storage medium. In accordance with one embodiment of the present disclosure, the non-transitory computer readable storage medium stores one or more programs including instructions, which when executed, causes one or more processing components to perform operations including: configuring a color of a first illuminating object to vary in a first pattern; controlling a camera to capture the first illuminating object according to a first color during a first time period; and controlling the camera to capture the first illuminating object according to a second color during a second time period after the first time period, wherein the second color is different from the first color.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
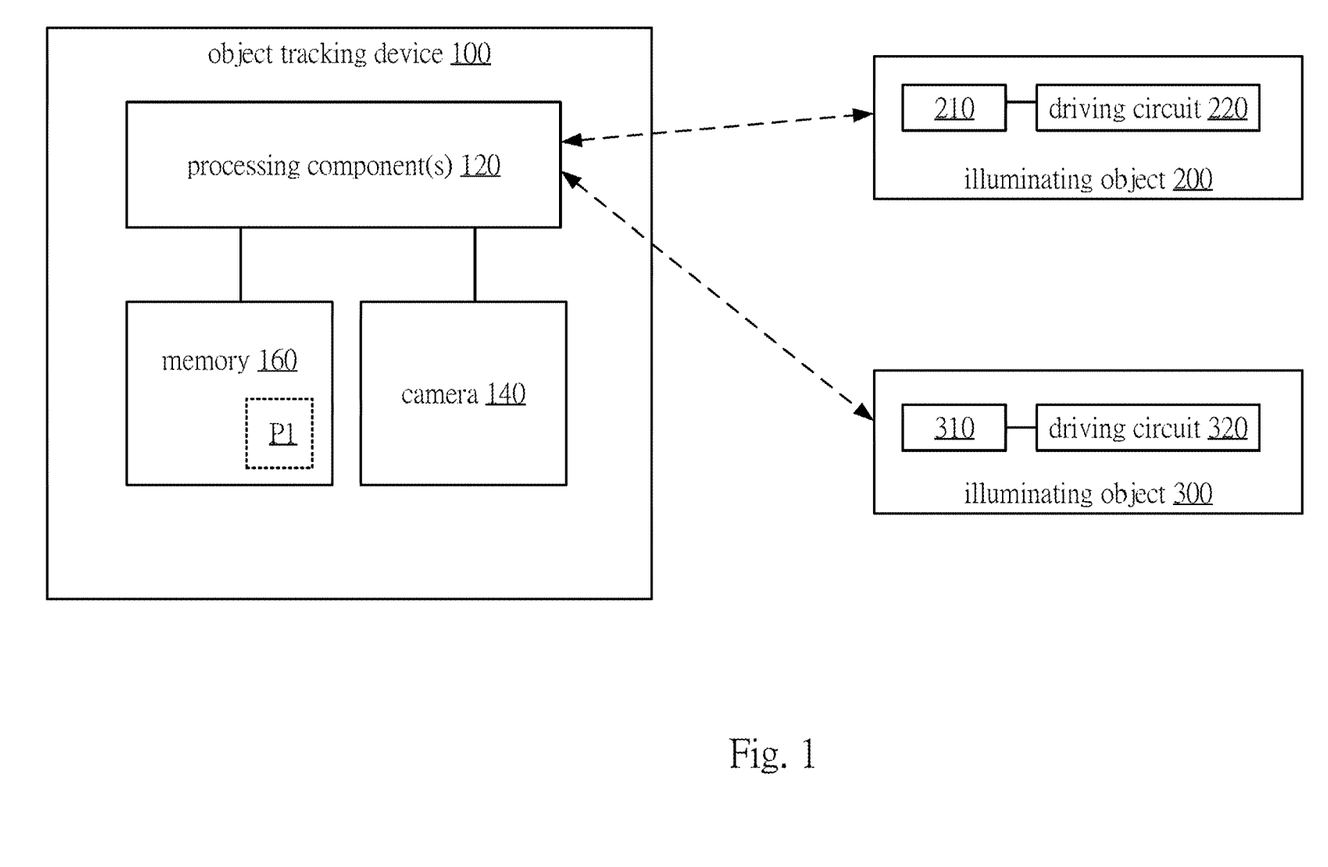
FIG. 1 is a schematic block diagram illustrating an object tracking device in accordance with some embodiments of the present disclosure.

Reference is made to FIG. 1. FIG. 1 is a schematic block diagram illustrating an object tracking device 100 in accordance with some embodiments of the present disclosure. In some embodiment, the object tracking device 100 may be applied in a virtual reality (VR)/mixed reality (MR)/augmented reality (AR) system for tracking the movement of one or more illuminating objects 200 and 300 in the physical/real-world environment. For example, the object tracking device 100 can be realized by, a standalone head mounted device (HMD) or VIVE HMD. In detail, the standalone HMD can handle such as processing location data of position and rotation, graph processing or others data calculation. The illuminating objects 200 and 300 may be a VR controller, which may be realized by, for example, a handheld controller, such as a controller for Vive HMD or a controller for Gear. Accordingly, on the condition that a user holding the illuminating object 200, the object tracking device 100 may detect the movement of the user by tracking the movement of the illuminating object 200. In addition, the object tracking device 100 may detect the movement of a plurality of users respectively by tracking the movement of each illuminating objects 200 and 300.

In the embodiment shown in FIG. 1, the object tracking device 100 includes one or more processing components 120, a camera 140, and a memory 160. As shown in FIG. 1, the one or more processing components 120 are electrically connected to the camera 140 and the memory 160. In some embodiments, the object tracking device 100 may further include signal transceivers (not shown) for transmitting and receiving signals between the object tracking device 100 and the one or more illuminating objects 200 and 300.

In some embodiments, the one or more processing components 120 can be realized by, for example, one or more processors, such as central processors and/or microprocessors, but are not limited in this regard. In some embodiments, the memory 160 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In some embodiments, the one or more processing components 120 may run or execute various software programs P1 and/or sets of instructions stored in memory 160 to perform various functions for the object tracking device 100. Thus, the object tracking device 100 may track the illuminating objects 200 and 300 using the camera 140.

Specifically, an illuminating element 210 is arranged on the illuminating object 200, and an illuminating element 310 is arranged on the illuminating object 300. The illuminating element 210 is electrically coupled to the driving circuit 220. The illuminating element 310 is electrically coupled to the driving circuit 320. In some embodiments, the illuminating elements 210 and 310 may be implemented by multi-colored LED luminaire modules. For example, the illuminating elements 210 may include a blue light LED unit, a red light LED unit, and a green light LED unit. Thus, the color of the illuminating elements 210 and 310 may be configured and changed by corresponding driving circuits 220 and 230 in the illuminating objects 200 and 300. For example, in some embodiments, the driving circuit 220 may output pulse-width modulation signals to the LED units respectively to adjust the light intensities of each of the LED units.

Figure 2:
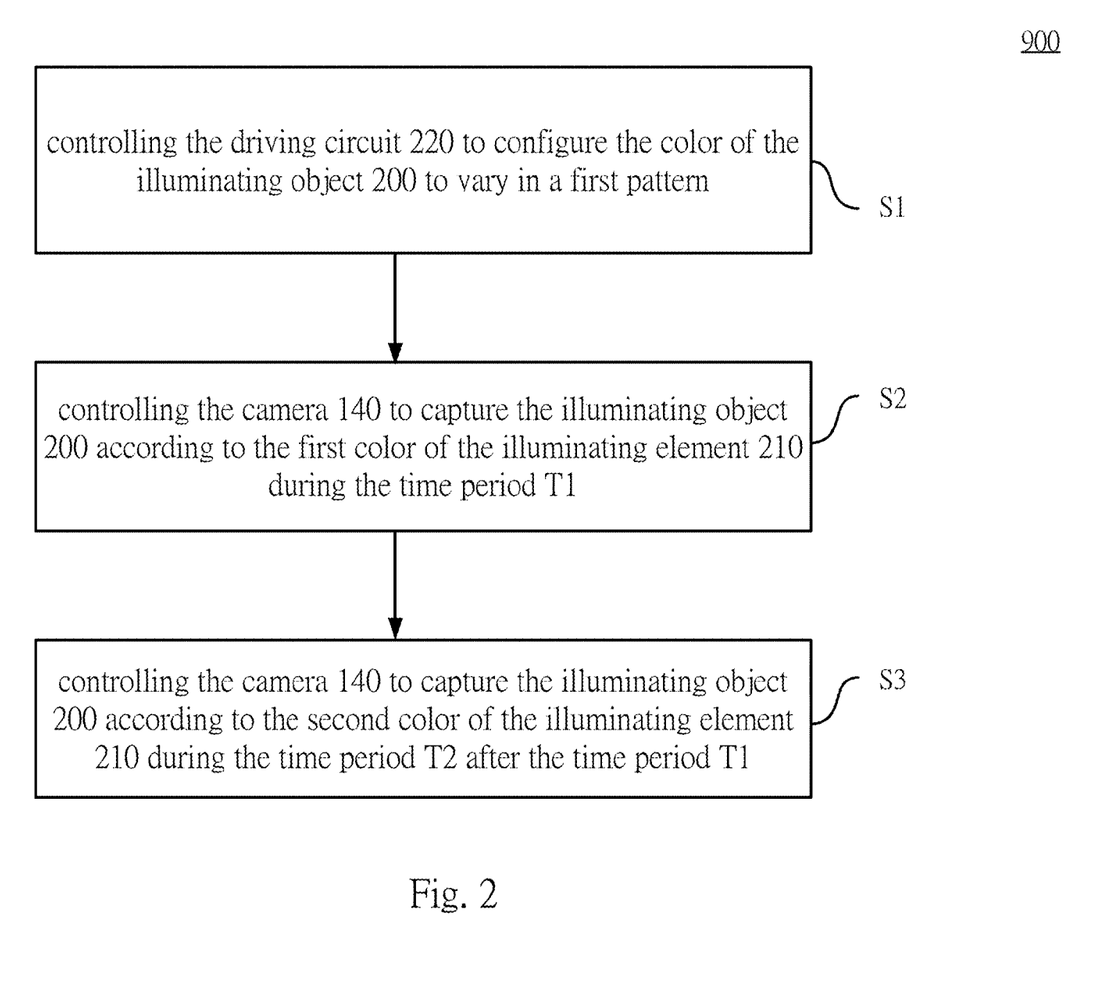
FIG. 2 is a flowchart illustrating an object tracking method in accordance with some embodiments of the present disclosure.

For better understanding of the present disclosure, the detailed operation of the object tracking device 100 will be discussed in accompanying with the embodiment shown in FIG. 2. FIG. 2 is a flowchart illustrating an object tracking method 900 in accordance with some embodiments of the present disclosure. It should be noted that the object tracking method 900 can be applied to an electrical device having a structure that is the same as or similar to the structure of the object tracking device 100 shown in FIG. 1. To simplify the description below, the embodiment shown in FIG. 1 will be used as an example to describe the object tracking method 900 according to some embodiments of the present disclosure. However, the present disclosure is not limited to application to the embodiment shown in FIG. 1.

As shown in FIG. 2, the object tracking method 900 includes operations S1, S2 and S3.

In operation S1, the one or more processing components 120 control the driving circuit 220 to configure the color of the illuminating object 200 to vary in a first pattern.

Figure 3A:
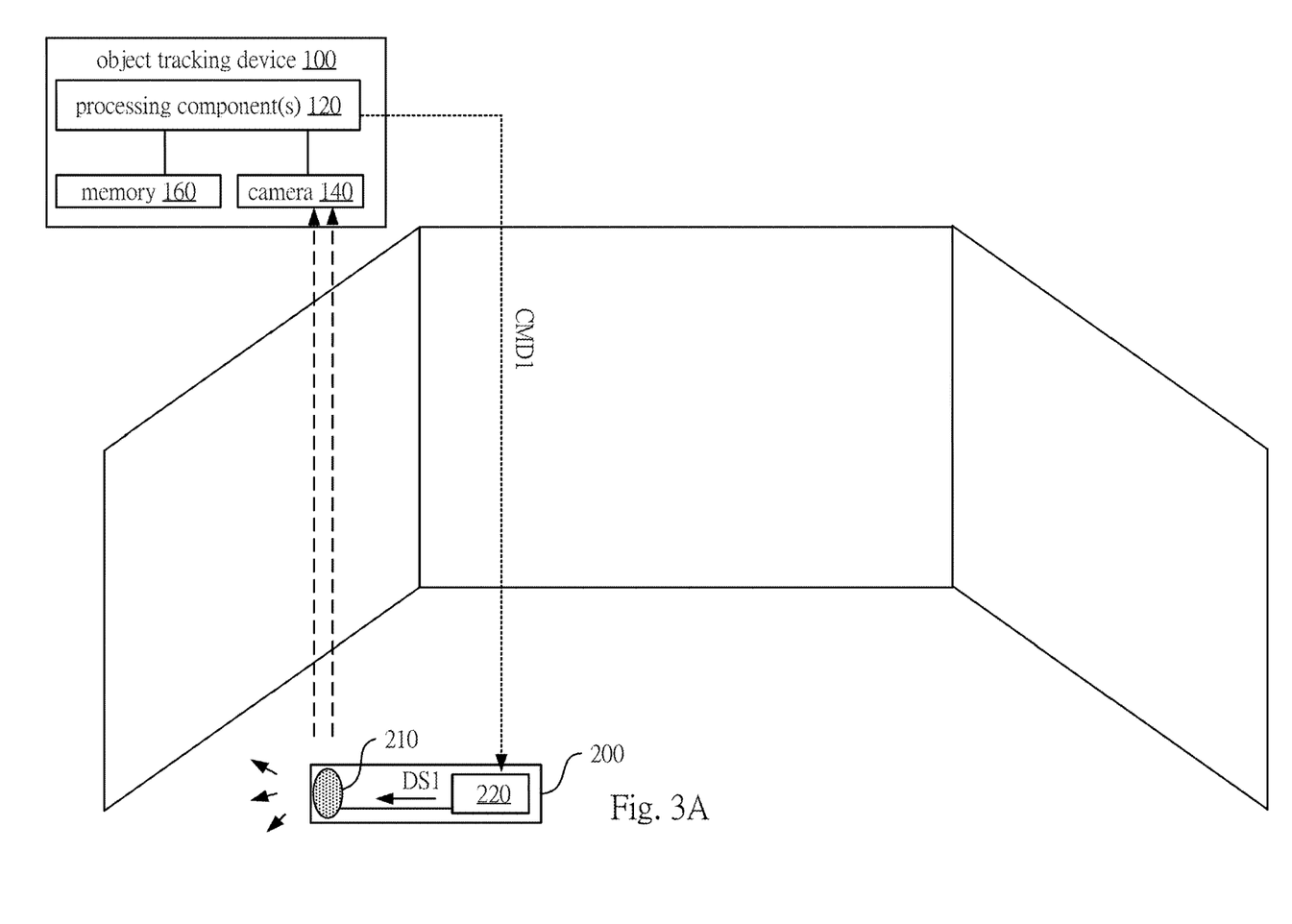
FIG. 3A and FIG. 3B are diagrams illustrating the configuration of the color pattern of the illuminating element according to some embodiments of the present disclosure.
Figure 3B:
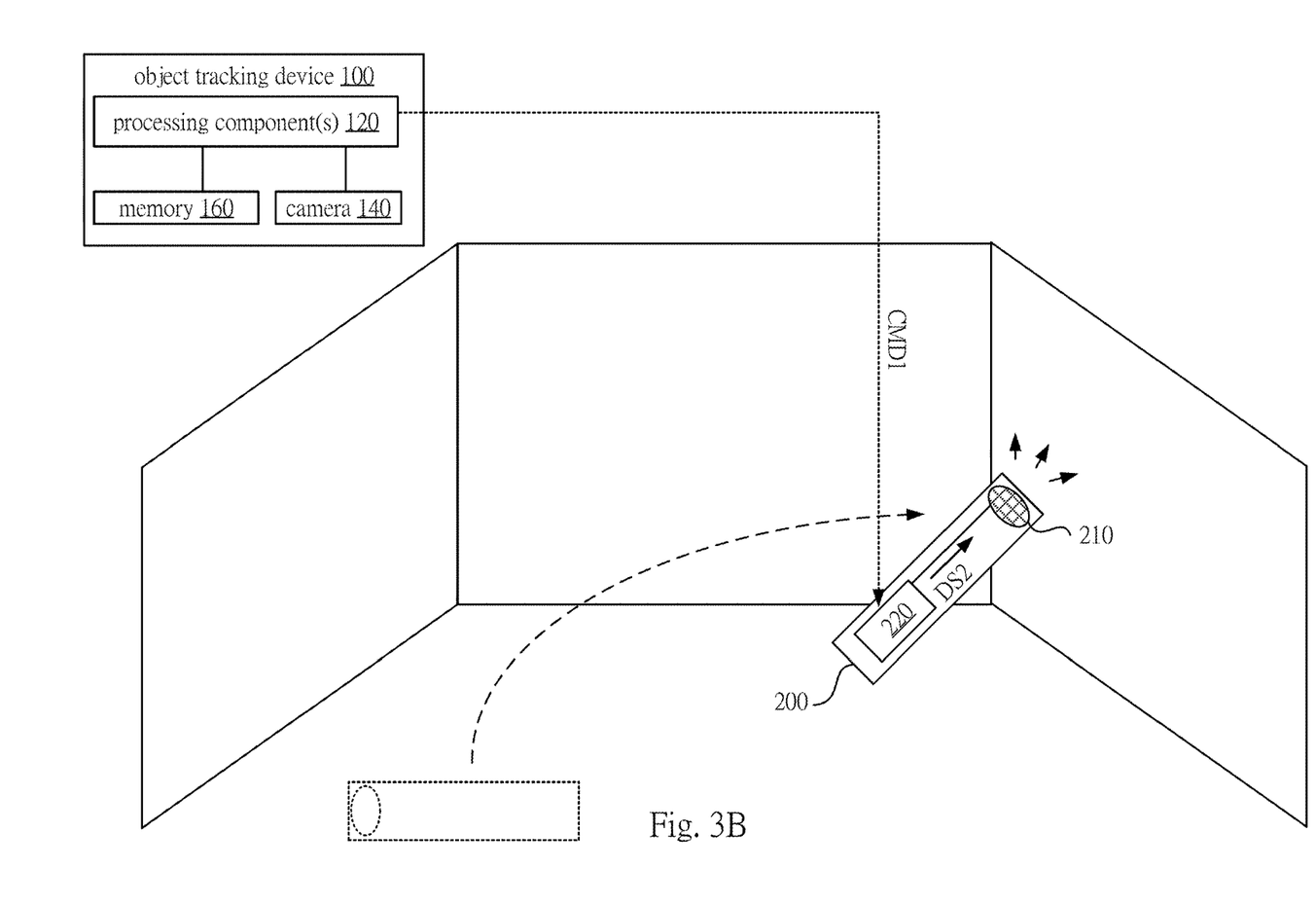

Reference is made to FIG. 3A and FIG. 3B together. FIG. 3A and FIG. 3B are diagrams illustrating the configuration of the color pattern of the illuminating element 210 according to some embodiments of the present disclosure.

As shown in FIG. 3A and FIG. 3B, in some embodiments, in operation S1, the one or more processing components 120 may, via signal transceivers, transmit a first host command CMD1 to the illuminating object 200 to control the illuminating object 200 to illuminate with the color varies in the first pattern. In some embodiments, the first host command CMD1 is transmitted through a downlink command channel.

As shown in FIG. 3A and FIG. 3B, in some embodiments, the first host command CMD1 may include codes for pulse-width modulation control of the illuminating element 210.

The following Table 1 is an example of the intensities of the green light LED unit, the red light LED unit and the blue light LED unit and the corresponding codes for pulse-width modulation control according to some embodiments.

TABLE 1

|  | Time Period | | | | |
| --- | --- | --- | --- | --- | --- |
|  | T1 | T2 | T3 | T4 | T5 |
| Green LED | 200 | 100 | 0 | 200 | 100 |
| Red LED | 100 | 200 | 100 | 200 | 100 |
| Blue LED | 200 | 0 | 100 | 0 | 200 |
| Code | (100, 100) | (−100, −200) | (−100, 0) | (0, −200) | (0, 100) |

As shown in FIG. 3A and Table 1, for example, in the first pattern, during the time period T1, the intensities of the green light LED unit, the red light LED unit and the blue light LED unit may be 200, 100, and 200 respectively, so as to output the first color. In detail, the coding scheme may be designed as (Green-Red, Blue-Red), and thus the one or more processing components 120 outputs the first host command CMD1 including the code (100, 100) and value of Red LED 100 to control the driving circuit 220 to output the corresponding driving signal DS1 to drive the illuminating element 210 to illuminate with the first color in time period T1.

Similarly, as shown in FIG. 3B and Table 1, during the time period T2, the intensities of the green light LED unit, the red light LED unit and the blue light LED unit may be 100, 200, and 0 respectively, so as to output the second color. In detail, the one or more processing components 120 may output the first host command CMD1 including the code (−100, −200) and value of Red LED 200 according to the same coding scheme to control the driving circuit 220 to output the corresponding driving signal DS2 to drive the illuminating element 210 to illuminate with the second color in time period T2. The operations during the time periods T3-T5 are similar and thus omitted herein for the sake of brevity.

It is noted that, in some embodiments, the one or more processing components 120 may output the first host command CMD1 including a sequence of codes including the command for multiple time periods together at once, so as to control the color of the illuminating element 210 in following time periods. For example, the first host command CMD1 may include the code [(100, 100), (−100, −200), (−100, 0)] at once according to the same coding scheme for the time periods T1 to T3. Alternatively stated, it is not necessary for the one or more processing components to output the first host command CMD1 in each time period to transmit the codes to control the driving circuit 220. In some other embodiments, the color-varying pattern may be repeating in a loop, and the one or more processing components may output the first host command CMD1 once to control the color-varying pattern of the illuminating object 200. Accordingly, the illuminating object 200 is configured to illuminate in the pattern defined by the first host command CMD1 until another command is received.

In some embodiments, the intensity of at least one of the LED units varies periodically. For example, in the embodiment shown in Table 1, the intensity of the red light LED unit shifts between 100 and 200 for each time period. Thus, the intensities of other LED units may be determined according to the code. It is noted that the coding scheme described herein is merely an example and not meant to limit the present disclosure. One skilled in the art may apply other coding schemes to denote the relationship of the intensities of LED units in the illuminating element 210.

Reference is made to FIG. 2 again. In operation S2, the one or more processing components 120 control the camera 140 to capture the illuminating object 200 according to the first color of the illuminating element 210 during the time period T1.

In operation S3, the one or more processing components 120 control the camera 140 to capture the illuminating object 200 according to the second color of the illuminating element 210 during the time period T2 after the time period T1. The second color is different from the first color.

Specifically, since the one or more processing components 120 may identify the color of the illuminating element 210 during the time periods T1 and T2 according to the code in the first host command CMD1, the one or more processing components 120 may perform image processing to the images captured by the camera 140, and identify the illuminating object 200 with the illuminating element 210 illuminating in the first color during the time period T1 and illuminating in the second color during the time period T2.

Therefore, if the one or more processing components 120 cannot clearly identify the illuminating object 200 while there is a similar background color, the one or more processing components 120 may identify the illuminating object 200 in the next time period since the color of the illuminating element 210 is changed. Accordingly, the image processing algorithm performed by the one or more processing components 120 do not have to spend too much time to remove the false target, and the accuracy of the object tracking may be improved.

Figure 4:
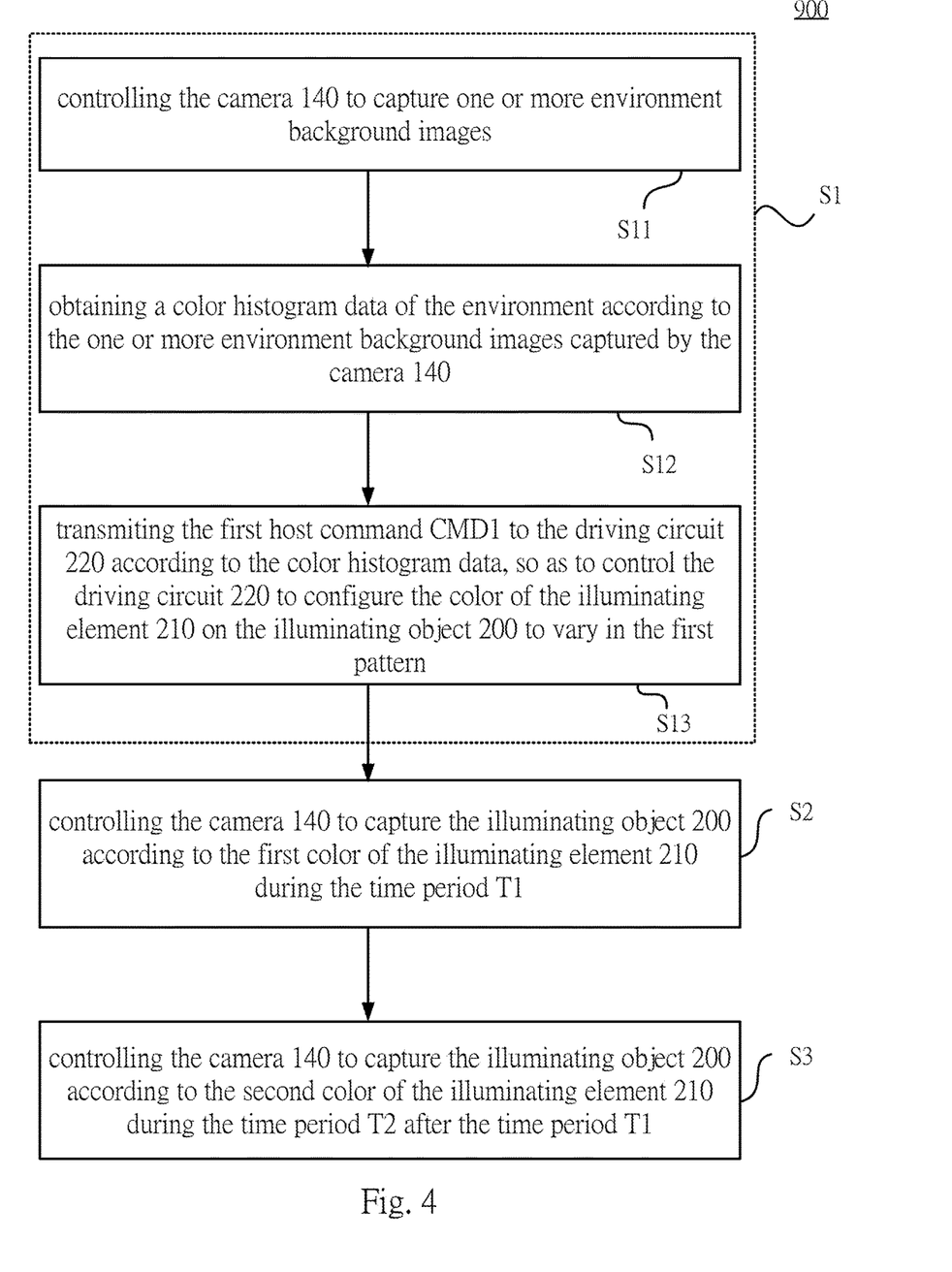
FIG. 4 is a flowchart illustrating the object tracking method in accordance with some other embodiments of the present disclosure.

Reference is made to FIG. 4. FIG. 4 is a flowchart illustrating the object tracking method 900 in accordance with some other embodiments of the present disclosure. The object tracking method 900 can be applied to an electrical device having a structure that is the same as or similar to the structure of the object tracking device 100 shown in FIG. 1. To simplify the description below, the embodiment shown in FIG. 1 will be used as an example to describe the object tracking method 900 according to some embodiments of the present disclosure. However, the present disclosure is not limited to application to the embodiment shown in FIG. 1.

Compared to the embodiments shown in FIG. 2, in the object tracking method 900 shown in FIG. 4, the operation S1 of the object tracking method 900 further includes operations S11, S12 and S13.

In operation S11, the one or more processing components 120 control the camera 140 to capture one or more environment background images.

In operation S12, the one or more processing components 120 obtain a color histogram data of the environment according to the one or more environment background images captured by the camera 140.

In operation S13, the one or more processing components 120 transmit the first host command CMD1 to the driving circuit 220 according to the color histogram data, so as to control the driving circuit 220 to configure the color of the illuminating element 210 on the illuminating object 200 to vary in the first pattern.

Alternatively stated, the color-varying pattern of the illuminating element 210 may be determined based on the environment background. The one or more processing components 120 may perform computation of histogram information based on the environment background images, so as to obtain a dominant color profile indicating the most frequent color in the environment background or a set of the most frequent colors in the environment background. Thus, the one or more processing components 120 may send corresponding command to the illuminating object 200 in order to change color into the color region which is less used in the environment background. Thus, the illuminating object 200 may stand out from the background, and the accuracy of the object tracking may be improved.

Specifically, if the color of the illuminating object 200 is similar to the background, the one or more processing components 120 may detect a plurality of false targets which should be identified and removed, and thus the efficiency and the accuracy may be affected. By designing the pattern of the color of the illuminating element 210 according to the detected environment background, the color of the illuminating element 210 is avoided from being too similar to the background, and thus the difficulties of object tracking may be lowered.

In addition, in some embodiments, the one or more processing components 120 may also determine the intensity of lighting of the illuminating element 210 based on the environment background images, so as to get a proper exposure condition and avoid overexposure or under exposure of the trackable illuminating object 200. Accordingly, by adaptively changing color base on environment color histogram, a robust tracking to distinguish between the illuminating object 200 and background may be achieved.

Figure 5:
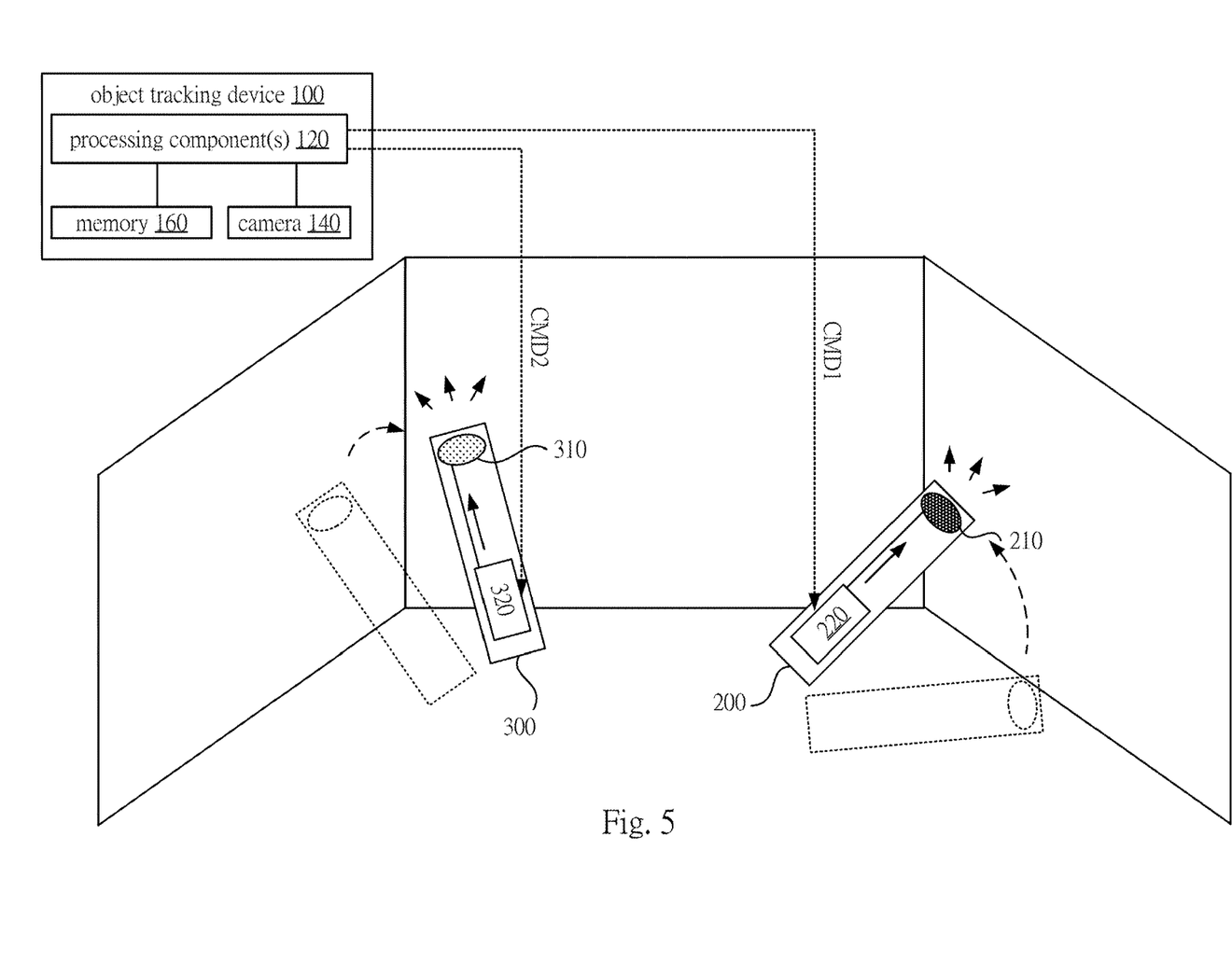
FIG. 5 is a diagram illustrating the configuration of the color pattern of the illuminating elements according to some embodiments of the present disclosure.

Reference is made to FIG. 5. FIG. 5 is a diagram illustrating the configuration of the color pattern of the illuminating element 210 and the illuminating element 310 according to some embodiments of the present disclosure.

As shown in FIG. 5, in some other embodiments, in operation S1, the one or more processing components 120 may also control the driving circuit 320 to configure the color of the illuminating element 310 on the illuminating object 300 to vary in a second pattern different from the first pattern. Specifically, the one or more processing components 120 may, via transceivers, transmit a second host command CMD2 to the driving circuit 320 in the illuminating object 300 to control the illuminating object 300 to illuminate with the color varies in the second pattern. Since the operation of the second host command is similar to the operation of the first host command, further explanation is omitted herein.

Thus, in operation S2 and S3, the one or more processing components 120 may identify the illuminating object 200 and the illuminating object 300 respectively according to whether the color varies in the first pattern or in the second pattern. Specifically, in operation S2, the one or more processing components 120 further control the camera 140 to capture the illuminating object 300 according to a third color of the illuminating element 310 during the time period T1. In operation S3, the one or more processing components 120 further control the camera 140 to capture the illuminating object 300 according to a fourth color of the illuminating element 310 during the time period T2 after the time period T1. In some embodiments, the fourth color is different from the third color.

It is noted that, since the color pattern of the illuminating element 310 and the illuminating element 210 are different, the one or more processing components 120 may still identify the illuminating objects 200 and 300 respectively even if the illuminating objects 200 and 300 illuminates in the same color during one or more time periods. For example, in some embodiments, the illuminating object 200 may illuminate in a red color during time period T1, and then illuminate in a blue color during time period T2. On the other hand, the illuminating object 300 may illuminate in a green color during time period T1, and then illuminate in the blue color during time period T2. Accordingly, although both the illuminating objects 200 and 300 illuminate in the blue color during time period T2, the illuminating objects 200 and 300 illuminate in different colors during former time period T1. Thus, the one or more processing components 120 may still identify the illuminating objects 200 and 300 according to the former location of the object, the tracking movement, and/or the specific color pattern in former or latter time periods to distinguish different objects.

In addition, in some other embodiments, the one or more processing components 120 may also detect the color-varying pattern of the illuminating objects 200 and 300 to receive a set of data from the illuminating objects 200 or 300 respectively.

Specifically, the driving circuits 220 or 320 may configure the illuminating pattern of the illuminating elements 210 or 310 in response to the user's action or status of the illuminating objects 200 or 300. For example, if a button on the illuminating object 200 is pressed or a trigger on the illuminating object 200 is triggered, the driving circuits 220 may output corresponding driving signal to the illuminating elements 210 such that the illuminating elements 210 illuminates in a predetermined pattern. Thus, the action of the user may be observed when the one or more processing components 120 detects the color-varying pattern of the illuminating elements 210 matches the predetermined pattern.

Similarly, status of the illuminating object 200 may also be transmitted from the illuminating object 200 to the one or more processing components 120 by the change of the color of the illuminating elements 210. For example, if a low battery status occurs, the driving circuits 220 may output corresponding driving signal to control the illuminating elements 210 to illuminate in a pattern indicating the low battery warning, and thus the one or more processing components 120 may identify the status of the illuminating object 200 by detecting the change of the color of the illuminating elements 210.

It should be noted that, in some embodiments, the object tracking method 900 may be implemented as a computer program. When the computer program is executed by a computer, an electronic device, or the one or more processing components 120 in FIG. 1, this executing device performs the object tracking method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned object tracking method 900, no particular sequence is required unless otherwise specified. Moreover, the operations may also be performed simultaneously or the execution times thereof may at least partially overlap.

Furthermore, the operations of the object tracking method 900 may be added to, replaced, and/or eliminated as appropriate, in accordance with various embodiments of the present disclosure.

Through the operations of various embodiments described above, an object tracking method with high efficiency and accuracy is implemented using the coding scheme to assist object recognition. Since the color of the trackable object varies in different time periods and standout from the environment background, the computation may be simplified.

Although the present disclosure has been described in considerable detail with reference to certain embodiments thereof, other embodiments are possible. Therefore, the scope of the appended claims should not be limited to the description of the embodiments contained herein.

What is claimed is:

1. An object tracking method comprising:
   capturing, by controlling a camera, one or more environment background images;
   obtaining, by one or more processing components, a color histogram data of environment according to the one or more environment background images;
   transmitting, by the one or more processing components, a first host command, according to the color histogram data, to a first illuminating object to configure a color of the first illuminating object, wherein the first host command is configured to control the first illuminating object to illuminate with the color varies in a first pattern;
   capturing, by controlling the camera, the first illuminating object according to a first color during a first time period; and
   capturing, by controlling the camera, the first illuminating object according to a second color during a second time period after the first time period, wherein the second color is different from the first color;
   wherein the first host command comprises at least one code, wherein the code is encoded, such that the first host command controls pulse-width modulation and a plurality of light intensities of a plurality of LED units arranged on the first illuminating object.

2. The object tracking method of claim 1, wherein the first host command is transmitted through a downlink command channel.

3. The object tracking method of claim 1, further comprising:
   configuring, by the one or more processing components, the color of a second illuminating object to vary in a second pattern different from the first pattern; and
   identifying, by the one or more processing components, the first illuminating object and the second illuminating object respectively according to whether the color varies in the first pattern or in the second pattern.

4. The object tracking method of claim 3, further comprising:
   capturing, by controlling the camera, the second illuminating object according to a third color during the first time period; and
   capturing, by controlling the camera, the second illuminating object according to a fourth color during the second time period after the first time period, wherein the fourth color is different from the third color.

5. The object tracking method of claim 1, further comprising:
   detecting, by controlling the camera, the change of the color of the first illuminating object to receive a set of data from the first illuminating object.

6. An object tracking device comprising:
   one or more processing components;
   a camera electrically connected to the one or more processing components;
   a memory electrically connected to the one or more processing components; and
   one or more programs, wherein the one or more programs are stored in the memory and configured to be executed by the one or more processing components, the one or more programs comprising instructions for:
   controlling the camera to capture one or more environment background images;
   obtaining a color histogram data of environment according to the one or more environment background images;
   transmitting a first host command, according to the color histogram data, to a first illuminating object to configure a color of the first illuminating object, wherein the first host command is configured to control the first illuminating object to illuminate with the color varies in a first pattern;
   controlling the camera to capture the first illuminating object according to a first color during a first time period; and
   controlling the camera to capture the first illuminating object according to a second color during a second time period after the first time period, wherein the second color is different from the first color;
   wherein the first host command comprises at least one code, wherein the code is encoded, such that the first host command controls pulse-width modulation and a plurality of light intensities of a plurality of LED units arranged on the first illuminating object.

7. The object tracking device as claimed in claim 6, wherein the first host command is transmitted through a downlink command channel.

8. The object tracking device as claimed in claim 6, further comprising instructions for:
   configuring the color of a second illuminating object to vary in a second pattern different from the first pattern; and
   identifying the first illuminating object and the second illuminating object respectively according to whether the color varies in the first pattern or in the second pattern.

9. The object tracking device as claimed in claim 8, further comprising instructions for:
   controlling the camera to capture the second illuminating object according to a third color during the first time period; and
   controlling the camera to capture the second illuminating object according to a fourth color during the second time period after the first time period, wherein the fourth color is different from the third color.

10. The object tracking device as claimed in claim 6, further comprising instructions for:
    controlling the camera to detect the change of the color of the first illuminating object to receive a set of data from the first illuminating object.

11. A non-transitory computer readable storage medium storing one or more programs comprising instructions, which when executed, causes one or more processing components to perform operations comprising:
    controlling a camera to capture one or more environment background images:
    obtaining, by one or more processing components, a color histogram data of environment according to the one or more environment background images;
    transmitting, by the one or more processing components, a first host command, according to the color histogram data, to a first illuminating object to configure a color of the first illuminating object, wherein the first host command is configured to control the first illuminating object to illuminate with the color varies in a first pattern;
    controlling the camera to capture the first illuminating object according to a first color during a first time period; and controlling the camera to capture the first illuminating object according to a second color during a second time period after the first time period, wherein the second color is different from the first color;

wherein the first host command comprises at least one code, wherein the code is encoded, such that the first host command controls pulse-width modulation and a plurality of light intensities of a plurality of LED units arranged on the first illuminating object.

12. The non-transitory computer readable storage medium as claimed in claim 11 comprising instructions, which when executed, causes one or more processing components to further perform operations comprising:

configuring, by the one or more processing components, the color of a second illuminating object to vary in a second pattern different from the first pattern; and identifying, by the one or more processing components, the first illuminating object and the second illuminating object respectively according to whether the color varies in the first pattern or in the second pattern.

13. The non-transitory computer readable storage medium as claimed in claim 12 comprising instructions, which when executed, causes one or more processing components to further perform operations comprising:

controlling the camera to capture the second illuminating object according to a third color during the first time period; and controlling the camera to capture the second illuminating object according to a fourth color during the second time period after the first time period, wherein the fourth color is different from the third color.

14. The non-transitory computer readable storage medium as claimed in claim 11 comprising instructions, which when executed, causes one or more processing components to further perform operations comprising:

controlling the camera to detect the change of the color of the first illuminating object to receive a set of data from the first illuminating object.

\* \* \* \* \*